United States Patent
Kim et al.

(10) Patent No.: US 11,090,635 B2
(45) Date of Patent: Aug. 17, 2021

(54) CARBON NANOTUBE HAVING HIGH SPECIFIC SURFACE AREA AND METHOD FOR MANUFACTURING SAME

(71) Applicant: LG CHEM, LTD., Seoul (KR)

(72) Inventors: SungJin Kim, Daejeon (KR); Seungyong Son, Daejeon (KR); Jihee Woo, Daejeon (KR); Dongchul Lee, Daejeon (KR); KyungYeon Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 355 days.

(21) Appl. No.: 14/438,165

(22) PCT Filed: Sep. 30, 2014

(86) PCT No.: PCT/KR2014/009225
§ 371 (c)(1),
(2) Date: Apr. 23, 2015

(87) PCT Pub. No.: WO2015/047042
PCT Pub. Date: Apr. 2, 2015

(65) Prior Publication Data
US 2015/0274529 A1    Oct. 1, 2015

(30) Foreign Application Priority Data

Sep. 30, 2013 (KR) .................. 10-2013-0116963
Sep. 26, 2014 (KR) .................. 10-2014-0129449

(51) Int. Cl.
*B01J 23/00* (2006.01)
*B01J 23/847* (2006.01)
(Continued)

(52) U.S. Cl.
CPC ......... *B01J 23/8472* (2013.01); *B01J 21/185* (2013.01); *B01J 23/881* (2013.01);
(Continued)

(58) Field of Classification Search
CPC ........ B01J 35/023; B01J 21/02; B01J 21/185; B01J 23/8472; B01J 23/881; B01J 23/882;
(Continued)

(56) References Cited

U.S. PATENT DOCUMENTS 7,378,075 B2   5/2008   Someya et al.
9,045,344 B2   6/2015   Takai et al.
(Continued)

FOREIGN PATENT DOCUMENTS

CN    101054159 A    10/2007
EP    1 674 154 A1    6/2006
(Continued)

OTHER PUBLICATIONS

Schwyzer et al., Long-term colloidal stability of 10 carbon nanotube types in the absence/presence of humic acid and calcium, Environmental Pollution 169 (2012) 64-73.*
(Continued)

*Primary Examiner* — Holly Rickman
*Assistant Examiner* — Linda N Chau
(74) *Attorney, Agent, or Firm* — Dentons US LLP (57) ABSTRACT

Provided is a method for preparing a supported catalyst that enables the production of carbon nanotubes having a large specific surface area in high yield. Carbon nanotubes produced using the supported catalyst are also provided. The carbon nanotubes are suitable for use in various applications due to their large specific surface area and high yield.

5 Claims, 5 Drawing Sheets

(51) Int. Cl.
*B01J 35/02* (2006.01)
*B01J 21/18* (2006.01)
*B01J 23/89* (2006.01)
*B01J 35/00* (2006.01)
*C01B 32/162* (2017.01)
*B01J 23/881* (2006.01)
*B01J 23/882* (2006.01)
*B82Y 30/00* (2011.01)
*B82Y 40/00* (2011.01)
*B01J 37/08* (2006.01)
*B01J 37/10* (2006.01)
*B01J 37/02* (2006.01)

(52) U.S. Cl.
CPC ......... *B01J 23/882* (2013.01); *B01J 23/8906* (2013.01); *B01J 23/8913* (2013.01); *B01J 35/002* (2013.01); *B01J 35/023* (2013.01); *C01B 32/162* (2017.08); *B01J 35/0013* (2013.01); *B01J 35/0033* (2013.01); *B01J 37/0203* (2013.01); *B01J 37/0207* (2013.01); *B01J 37/08* (2013.01); *B01J 37/10* (2013.01); *B82Y 30/00* (2013.01); *B82Y 40/00* (2013.01); *C01B 2202/22* (2013.01); *C01B 2202/32* (2013.01); *Y10T 428/2918* (2015.01); *Y10T 428/2982* (2015.01)

(58) Field of Classification Search
CPC .. B01J 23/8906; B01J 23/8913; B01J 35/002; B01J 35/0013; B01J 35/0033; B01J 37/0203; B01J 37/0207; B01J 37/08
See application file for complete search history.

(56) References Cited

U.S. PATENT DOCUMENTS

| | | |
|---|---|---|
| 2005/0008562 A1 | 1/2005 | Hyeon et al. |
| 2010/0062229 A1* | 3/2010 | Hata .................. B82Y 30/00 428/195.1 |
| 2010/0119822 A1* | 5/2010 | Hwang .................. B82Y 30/00 428/364 |
| 2010/0266478 A1 | 10/2010 | Kim et al. |
| 2011/0027512 A1* | 2/2011 | Lee .......................... C08L 77/02 428/36.9 |
| 2014/0127586 A1 | 5/2014 | Kamizono et al. |

FOREIGN PATENT DOCUMENTS

| | | | |
|---|---|---|---|
| JP | 2004-002182 A | | 1/2004 |
| JP | 2009-091700 A | | 4/2009 |
| JP | 2010-084316 A | | 4/2010 |
| JP | 2011-519809 A | | 7/2011 |
| JP | 2012224687 A | * | 11/2012 |
| JP | 2013-001612 A | | 1/2013 |
| KR | 10-2010-0067048 A | | 7/2010 |
| KR | 10-2012-0095284 A | | 8/2012 |
| KR | 10-2013-0007882 A | | 1/2013 |
| KR | 10-2013-0034328 A | | 4/2013 |
| KR | 10-2013-0078777 A | | 7/2013 |
| WO | 03/004410 A1 | | 1/2003 |
| WO | 2007/033438 A1 | | 3/2007 |
| WO | 2011-108492 A1 | | 9/2011 |

OTHER PUBLICATIONS

Li et al., Characterization of single-wall carbon nanotubes by N2 adsorption, Carbon 42 (2004) 2375-2383.*
English Machine Translation: Kanbara et al. (JP 2012224687).*
Peigney et al., Specific surface area of carbon nanotubes and bundles of carbon nanotubes, Carbon 39, 507-517, 2001.*
Lehman et al., Evaluating the Characterisitcs of multiwall carbon nanotube, Carbon 49, 2581-2602, 2011.*
Bokobza, L., et al., "Raman spectroscopic characterization of multiwall carbon nanotubes and of composites," eXpress Polymer Letters, vol. 6, No. 7, 2012, pp. 601-608, XP 002771998.

* cited by examiner

CARBON NANOTUBE HAVING HIGH SPECIFIC SURFACE AREA AND METHOD FOR MANUFACTURING SAME

This application is a National Stage Entry of International Application No.: PCT/KR2014/009225, filed on Sep. 30, 2014, which claims the benefit of Korean Patent Application No. 10-2013-0116963, filed on Sep. 30, 2013, and Korean Patent Application No. 10-2014-0129449, filed on Sep. 26, 2014, all of which are hereby incorporated herein by reference in their entirety.

BACKGROUND OF THE INVENTION

1. Field of the Invention

The present invention relates to a method for preparing a supported catalyst, and more particularly to carbon nanotubes having a large specific surface area and a method for producing the carbon nanotubes.

2. Description of the Related Art

Carbon nanostructures (CNSs) refer collectively to nano-sized carbon structures having various shapes, such as nanotubes, nanohairs, fullerenes, nanocones, nanohorns, and nanorods. Carbon nanostructures can be widely utilized in a variety of technological applications because they possess excellent characteristics.

Carbon nanotubes (CNTs) are tubular materials consisting of carbon atoms arranged in a hexagonal pattern and have a diameter of approximately 1 to 100 nm. Carbon nanotubes exhibit insulating, conducting or semiconducting properties originated from their inherent chirality. Carbon nanotubes have a structure in which carbon atoms are strongly covalently bonded to each other. Due to this structure, carbon nanotubes have a tensile strength approximately 100 times that of steel, are highly flexible and elastic, and are chemically stable.

Carbon nanotubes are divided into three types: single-walled carbon nanotubes (SWCNTs) consisting of a single sheet and having a diameter of about 1 nm; double-walled carbon nanotubes (DWCNTs) consisting of two sheets and having a diameter of about 1.4 to about 3 nm; and multi-walled carbon nanotubes (MWCNTs) consisting of three or more sheets and having a diameter of about 5 to about 100 nm.

Carbon nanotubes are being investigated for their commercialization and application in various industrial fields, for example, aerospace, fuel cell, composite material, biotechnology, pharmaceutical, electrical/electronic, and semiconductor industries, due to their high chemical stability, flexibility and elasticity. However, carbon nanotubes have a limitation in directly controlling the diameter and length to industrially applicable dimensions for practical use owing to their primary structure. Accordingly, the industrial application and use of carbon nanotubes are limited despite their excellent physical properties.

Carbon nanotubes are generally produced by various techniques, such as arc discharge, laser ablation, and chemical vapor deposition. However, arc discharge and laser ablation are not appropriate for mass production of carbon nanotubes and require high arc production costs or expensive laser equipment. Chemical vapor deposition using a vapor dispersion catalyst has the problems of a very low synthesis rate and too small a size of final CNT particles. Chemical vapor deposition using a substrate-supported catalyst suffers from very low efficiency in the utilization of a reactor space, thus being inappropriate for mass production of CNTs. Thus, studies on catalysts and reaction conditions for chemical vapor deposition are currently underway to increase the yield of carbon nanotubes.

Under these circumstances, a need exists for CNTs that have a large specific surface area and are readily dispersible in and miscible with polymers during compounding with the polymers, thus being suitable for use in the manufacture of composite materials with improved physical properties.

SUMMARY OF THE INVENTION

It is therefore an object of the present invention to provide bundle type CNTs that have a large specific surface area and are readily dispersible in and miscible with polymers during compounding.

It is a further object of the present invention to provide a method for producing the bundle type CNTs in high yield.

One aspect of the present invention provides bundle type carbon nanotubes having a BET specific surface area of at least 200 m$^2$/g wherein the BET specific surface area and the ratio of the integrated area under the G-band peak ($I_G$) to the integrated area under the D-band peak ($I_D$) ($I_G/I_D$) measured by Raman spectroscopy satisfy the following relationship:

$$y=ax+b$$

where y is the BET specific surface area, x is the ratio $I_G/I_D$, a is a constant from −400 to −500, and b is a constant from 600 to 800.

According to one embodiment, the BET specific surface area (y) and the ratio $I_G/I_D$ (x) of the carbon nanotubes satisfy the following relationship:

$$200 \le y \le -427.2x+800$$

where y is the BET specific surface area (m$^2$/g) and x is the ratio $I_G/I_D$.

According to a preferred embodiment of the present invention, the ratio of the integrated area under the G-band peak ($I_G$) to the integrated area under the D-band peak ($I_D$) ($I_G/I_D$) may be from 0.7 to 1.3.

The carbon nanotubes may be produced using a supported catalyst. The supported catalyst may be prepared by primarily calcining a support precursor having a BET specific surface area of 1 m$^2$/g or less at a temperature of 100 to 450° C. to form a support, supporting a graphitization metal catalyst on the support, and secondarily calcining the catalyst supported on the support at a temperature of 100 to 500° C.

According to one embodiment, the particle size and number average particle diameter of the supported catalyst may be adjusted to 30 to 150 μm and 40 to 80 μm, respectively, by sorting before use.

According to the present invention, the support is preferably based on aluminum and the support precursor is particularly preferably aluminum trihydroxide [Al(OH)$_3$].

According to a preferred embodiment of the present invention, the secondary calcination is performed at a temperature of 100° C. to 300° C.

In the present invention, the graphitization metal catalyst may be selected from the group consisting of nickel (Ni), cobalt (Co), iron (Fe), platinum (Pt), gold (Au), aluminum (Al), chromium (Cr), copper (Cu), magnesium (Mg), manganese (Mn), molybdenum (Mo), rhodium (Rh), silicon (Si), tantalum (Ta), titanium (Ti), tungsten (W), uranium (U), vanadium (V), zirconium (Zr), and alloys thereof.

In the present invention, the graphitization metal catalyst may be a binary or multi-component metal catalyst including a main catalyst and an auxiliary catalyst.

In the present invention, the main catalyst may be selected from Co, Fe, and mixtures thereof, and the auxiliary catalyst may be selected from Mo, V, and mixtures thereof.

According to a preferred embodiment of the present invention, the graphitization metal catalyst is a binary metal catalyst selected from Co/Mo, Co/V, Fe/Mo, and Fe/V.

The graphitization metal catalyst may include the main catalyst and the auxiliary catalyst in a molar ratio of 10:0.5-5.

The graphitization catalyst may be supported in an amount of 5 to 40 parts by weight, based on 100 parts by weight of the supported catalyst.

A further aspect of the present invention provides a method for producing carbon nanotubes (CNTs), including primarily calcining a support precursor having a BET specific surface area of 1 $m^2/g$ or less at a temperature of 100 to 450° C. to form a support, supporting a graphitization metal catalyst on the support, secondarily calcining the catalyst supported on the support at a temperature of 100 to 500° C. to prepare a supported catalyst, and bringing the supported catalyst into contact with a carbon source in the gas phase.

In the present invention, the specific surface area of the carbon nanotubes may increase with decreasing secondary calcination temperature.

The carbon source in the gas phase may be selected from the group consisting of carbon monoxide, methane, ethane, ethylene, ethanol, acetylene, propane, propylene, butane, butadiene, pentane, pentene, cyclopentadiene, hexane, cyclohexane, benzene, toluene, and mixtures thereof.

The reaction temperature may be from 600° C. to 750° C.

Another aspect of the present invention provides a composite material including the bundle type carbon nanotubes.

The carbon nanotubes (CNTs) of the present invention have a large specific surface area and are highly dispersible and miscible. Due to these advantages, the carbon nanotubes of the present invention can be used to manufacture a composite material with improved physical properties. Therefore, the carbon nanotubes of the present invention can find application in various fields, such as energy materials, functional composites, pharmaceuticals, batteries, semiconductors, and display devices.

DETAILED DESCRIPTION OF THE INVENTION

The present invention will now be described in more detail.

The present invention is directed to a method for producing bundle type CNTs whose specific surface area can be adjusted to an appropriate level by optimizing the steps of pretreating a support, preparing a supported catalyst using the support, and producing CNTs using the supported catalyst. The present invention is also directed to CNTs produced by the method.

Unless otherwise mentioned, the term "bundle type" used herein refers to a type of carbon nanotubes in which the carbon nanotubes are arranged in parallel or get entangled to form bundles or ropes, and the term "non-bundle or entangled type" used herein refers to a type of carbon nanotubes that does not have a specific shape such as a bundle- or rope-like shape.

Raman spectroscopy is a tool suited for analyzing the structure of CNTs, particularly, the surface state of CNTs. The peak appeared at around a wavenumber of 1580 $cm^{-1}$ in the Raman spectrum of CNTs is called G band, which corresponds to $sp^2$ bonds of CNTs and is indicative of a carbon crystal free of structural defects. The peak appeared at around a wavenumber of 1360 $cm^{-1}$ in the Raman spectrum is called D band, which corresponds to $sp^3$ bonds of CNTs and is indicative of carbon containing structural defects. The integrated areas under the G-band peak and the D-band peak are referred to as $I_G$ and $I_D$, respectively.

In the Raman spectrum of the CNTs according to the present invention, the G band may be a peak appeared in the wavenumber range of 1580±50 $cm^{-1}$ and D band may be a peak appeared in the wavenumber range of 1360±50 $cm^{-1}$. The wavenumbers at which the G band and the D band are observed may be shifted depending on what type of laser source is used for Raman spectroscopy.

The Raman spectrum used in the present invention is not particularly limited but is preferably measured at a laser wavelength of 532 nm using a DXR Raman microscope (Thermo Electron Scientific Instruments LLC).

The ratio of the integrated area under the G-band peak ($I_G$) to the integrated area under the D-band peak ($I_D$) in the Raman spectrum of the CNTs according to the present invention is from 0.7 to 1.3. An $I_D/I_G$ of less than 5 indicates the presence of a large amount of amorphous carbon in CNTs or poor crystallinity of CNTs. The CNTs of the present invention has good crystallinity and an $I_D/I_G$ within the range defined above because they have a large BET specific surface area and a secondary shape of bundle type.

Based on such characteristics, the bundle type CNTs of the present invention has a BET specific surface area of at least 200 $m^2/g$. The BET specific surface area is substantially inversely proportional to the ratio of the integrated area under the G-band peak ($I_G$) to the integrated area under the D-band peak ($I_D$) ($I_G/I_D$) in the Raman spectrum of the carbon nanotubes. Specifically, the BET specific surface area and the ratio $I_G/I_D$ satisfy the following relationship:

$$y=ax+b$$

where y is the BET specific surface area, x is the ratio $I_G/I_D$, a is a constant from −400 to −500, and b is a constant from 600 to 800.

a may be a constant from −400 to −450 or a constant from −450 to −500, and b may be a constant from 600 to 700, from 650 to 750, or from 700 to 800.

According to one embodiment, the BET specific surface area (y) and the ratio $I_G/I_D$ (x) of the carbon nanotubes satisfy the following relationship:

$$200 \leq y \leq -427.2x+800$$

In the present invention, the specific surface area of the carbon nanotubes is measured by the BET method. Specifically, the specific surface area of the carbon nanotubes is calculated by measuring the amount of nitrogen gas adsorbed at a liquid nitrogen temperature of 77 K using BELSORP-mini II (BEL Japan).

The CNTs of the present invention may have a BET specific surface area of 200 to 500 m²/g, 200 to 300 m²/g, 300 to 500 m²/g, 300 to 400 m²/g, or 200 to 400 m²/g.

The CNTs of the present invention may have an $I_G/I_D$ in the range of about 0.7 to about 1.3, about 0.7 to about 1.1, about 0.7 to about 1.0, about 0.7 to about 0.9, about 0.8 to about 1.0, or about 0.9 to about 1.1, as measured by Raman spectroscopy.

Figure 1:
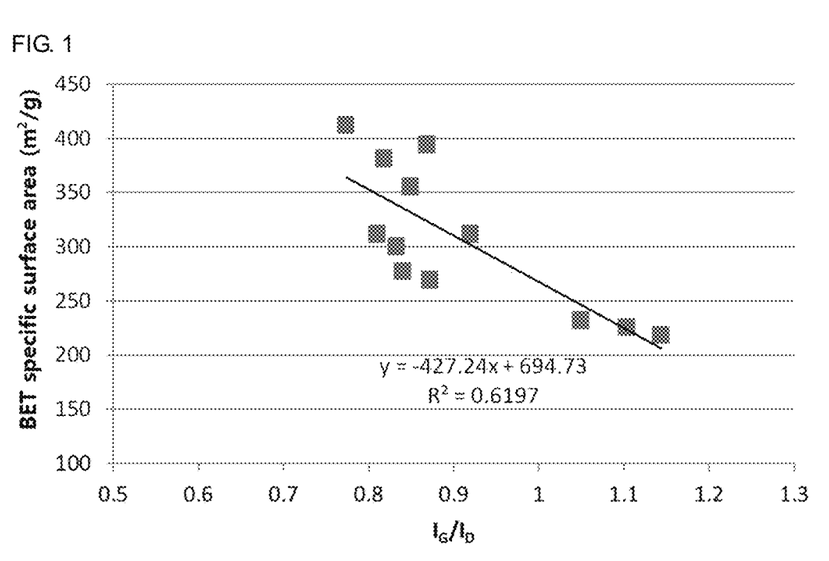
FIG. 1 is a graph showing the relationship between the BET specific surface areas and the ratios $I_G/I_D$ of carbon nanotube aggregates produced in Examples 1-12.
Figure 2:
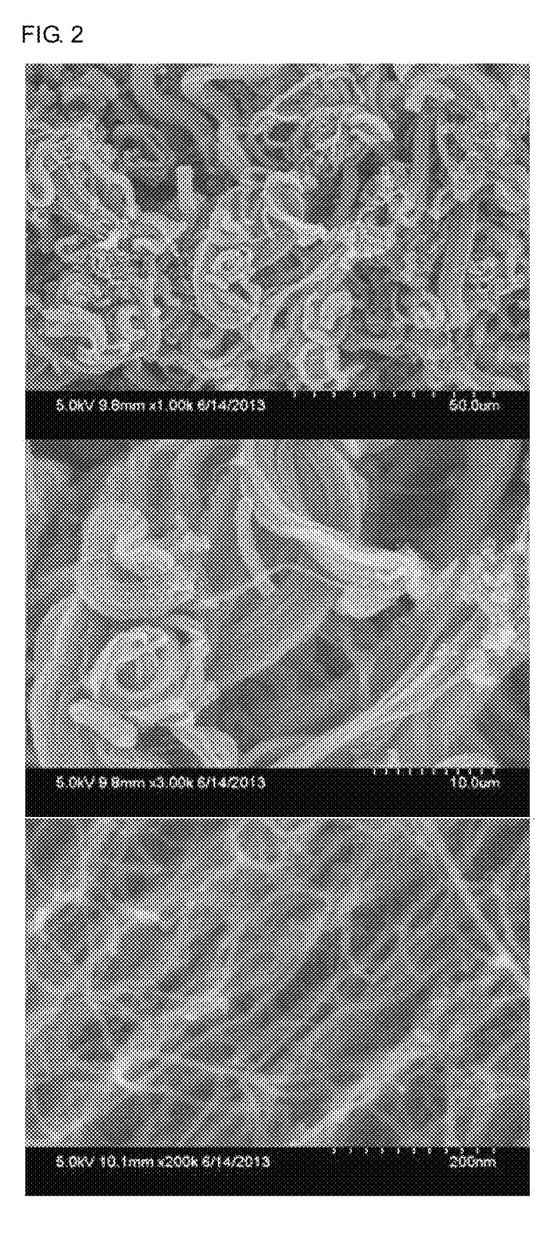
FIG. 2 shows SEM images of bundle type CNTs produced in Example 3.
Figure 3:
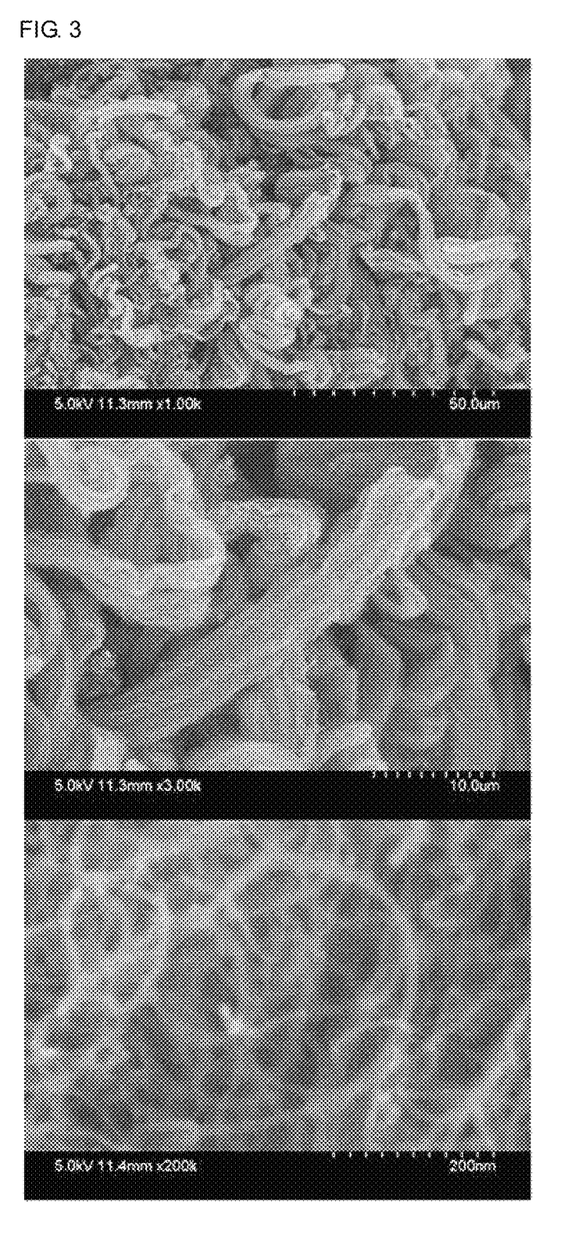
FIG. 3 shows SEM images of bundle type CNTs produced in Example 12.
Figure 4:
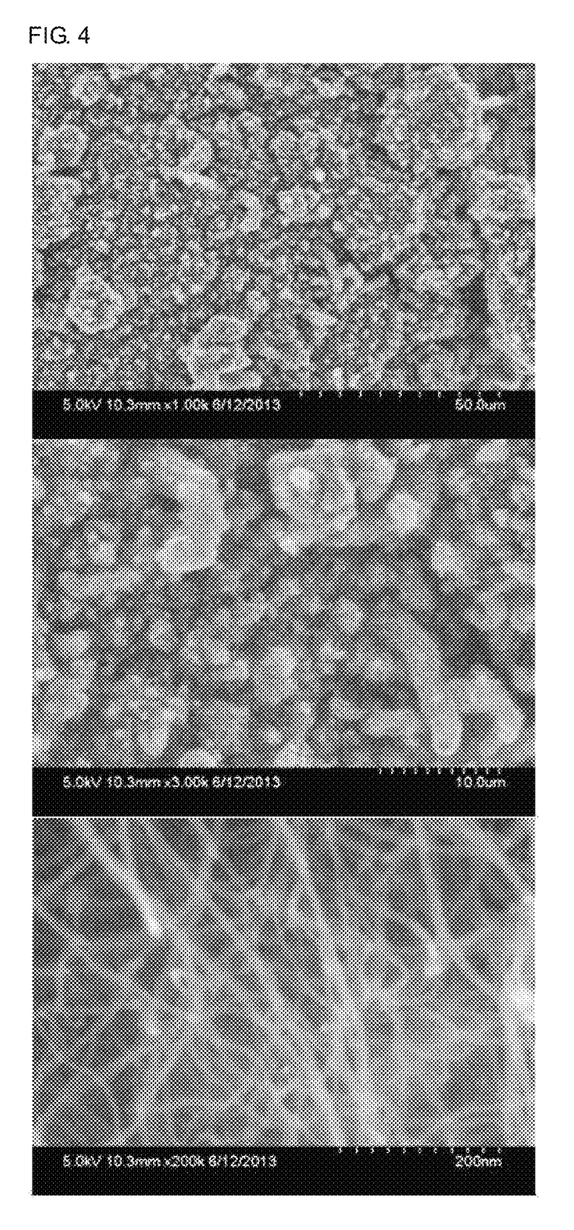
FIG. 4 shows SEM images of non-bundle type CNTs produced in Comparative Example 1.
Figure 5:
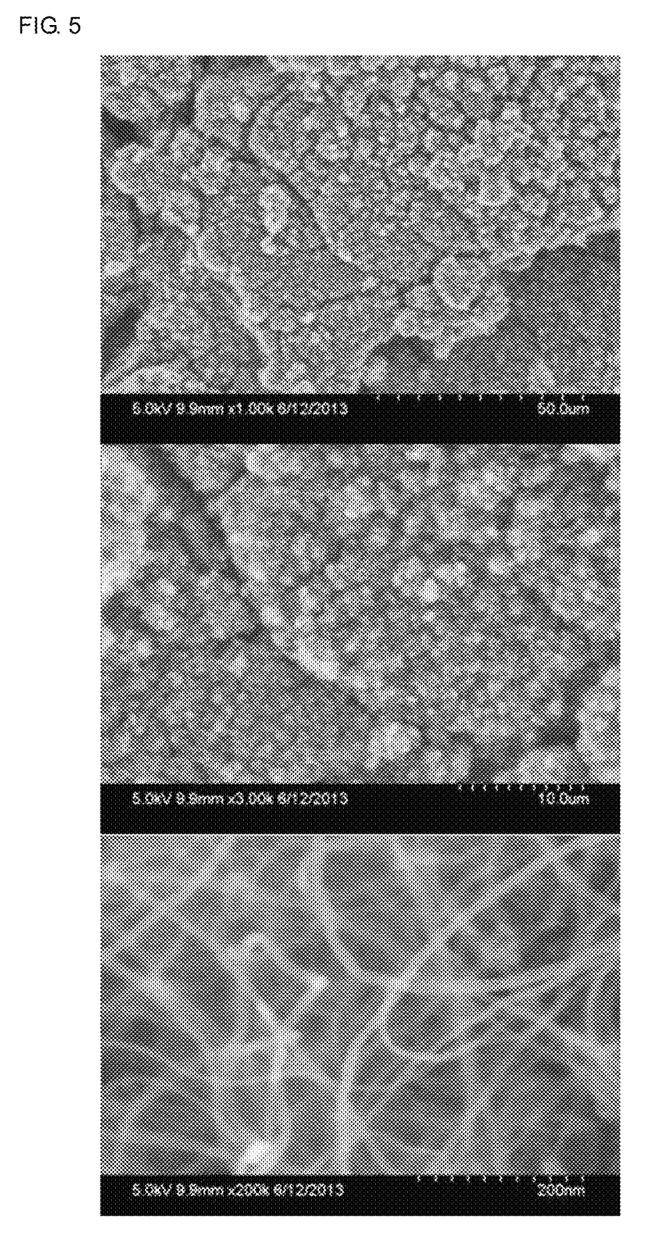
FIG. 5 shows SEM images of non-bundle type CNTs produced in Comparative Example 2.

Specifically, FIG. 1 is a graph showing the relationship between the BET specific surface areas and the ratios $I_G/I_D$ of CNTs produced in Examples 1-12. The ratio $I_G/I_D$ of conventional CNTs shows a tendency to increase with increasing BET specific surface area. In contrast, the ratio $I_G/I_D$ of the CNTs according to the present invention shows a tendency to decrease constantly with increasing BET specific surface area, which can be confirmed from the graph of FIG. 1.

A larger BET specific surface area of conventional CNTs indicates a smaller diameter of the CNTs, and as a result, the ratio $I_G/I_D$ representing the crystallinity or degree of arrangement of the CNTs is expected to increase because the curvature of the CNTs increases. In contrast, the CNTs of the present invention have a tendency opposite to that of conventional CNTs.

According to a preferred embodiment, the BET specific surface area and the ratio of the integrated area under the G-band peak ($I_G$) to the integrated area under the D-band peak ($I_D$) ($I_G/I_D$) in the Raman spectrum of the carbon nanotubes satisfy the following relationship:

$$-427.2x+600 \le y \le -427.2x+800$$

According to one embodiment, the BET specific surface area (y) and the ratio $I_G/I_D$ (x) of the CNTs may satisfy the following relationship:

$$-427.2x+600 \le y \le -427.2x+700$$

According to a further embodiment, the BET specific surface area (y) and the ratio $I_G/I_D$ (x) of the CNTs may satisfy the following relationship:

$$-427.2x+650 \le y \le -427.2x+750$$

According to another embodiment, the BET specific surface area (y) and the ratio $I_G/I_D$ (x) of the CNTs may satisfy the following relationship:

$$-427.2x+700 \le y \le -427.2x+800$$

According to one embodiment of the present invention, a method for preparing a supported catalyst for the production of CNTs is provided which includes primarily calcining a support precursor at an appropriate temperature, for example, 100 to 450° C., to obtain a support, supporting a graphitization catalyst on the support, and secondarily calcining the catalyst supported on the support at a temperature of 100 to 500° C.

When the supported catalyst is brought into contact with a carbon source in the gas phase, bundle type carbon nanotubes having a BET specific surface area of at least 200 m²/g can be produced.

The support precursor used in the method performs to support the graphitization catalyst and can control the shape of CNTs depending on the kind thereof.

As the support precursor, there may be used, for example, an aluminum-based support precursor. The support precursor is preferably aluminum trihydroxide (ATH). The support precursor may be dried at 50 to 150° C. for 1 to 24 hours before use.

The support precursor is primarily calcined to form a support. The first calcination temperature is preferably lower than 500° C. and is much lower than 700° C. known as the temperature at which aluminum trihydroxide is converted to alumina. Specifically, the primary calcination may include heat treatment at a temperature of about 100 to about 450° C., about 120 to about 400° C., about 200 to about 450° C., about 300 to about 450° C., or about 200 to about 400° C.

The aluminum-based support thus prepared preferably includes 30% by weight or more of AlO(OH), which is converted from Al(OH)$_3$, but does not include Al$_2$O$_3$, which is also converted from Al(OH)$_3$.

The aluminum (Al)-based support may further include at least one oxide selected from the group consisting of ZrO$_2$, MgO, and SiO$_2$. The aluminum (Al)-based support may have a spherical or potato-like shape. The material for the aluminum (Al)-based support may have a structure suitable to provide a relatively large surface area per unit weight or volume, such as a porous structure, a molecular sieve structure, or a honeycomb structure.

According to one embodiment, the support precursor may have a primary particle diameter of about 20 to about 200 µm, a porosity of about 0.1 to about 1.0 cm³/g, and a specific surface area smaller than about 1 m²/g.

The primary calcination time may be in the range of about 0.5 to about 10 hours, preferably about 1 to about 5 hours, but is not limited to this range.

The graphitization catalyst used in the method may be brought into contact with a carbon source in the gas phase to produce CNTs. A detailed description will be given of the growth of CNTs. First, a carbonaceous material as the gas-phase carbon source is brought into contact with the graphitization catalyst, for example, a graphitization metal catalyst, followed by heat treatment. As a result of the heat treatment, the carbonaceous material is thermally decomposed on the surface of the metal catalyst and carbon atoms formed from the carbon-containing gas as a result of the decomposition are infiltrated into and solubilized in the graphitization metal catalyst. If the amount of the carbon atoms infiltrated exceeds the solubility limit, an inherent feature of the graphitization metal catalyst, the carbon atoms form nuclei, which grow into CNTs.

The graphitization metal catalyst plays a role in helping the carbon components present in the carbonaceous material bind to each other to form hexagonal ring structures. The graphitization metal catalyst may be, for example, a catalyst for graphite synthesis, carbonization induction, or CNT production. More specifically, the graphitization metal catalyst can be selected from the group consisting of nickel (Ni), cobalt (Co), iron (Fe), platinum (Pt), gold (Au), aluminum (Al), chromium (Cr), copper (Cu), magnesium (Mg), manganese (Mn), molybdenum (Mo), rhodium (Rh), silicon (Si), tantalum (Ta), titanium (Ti), tungsten (W), uranium (U), vanadium (V), zirconium (Zr), and alloys thereof.

The graphitization catalyst may be a binary or multi-component metal system. The binary or multi-component graphitization catalyst may include a main catalyst and an auxiliary catalyst. As the main catalyst, there may be used, for example, Co, Fe or Ni. As the auxiliary catalyst, there may be used, for example, Mo or V. Examples of suitable binary or multi-component graphitization catalysts include Co/Mo, Co/V, Fe/Mo, Fe/V, Fe/Co, Fe/Co/V, Fe/Co/Mo, Co/Mo/V, Fe/Mo/V, and Fe/Co/Mo/V. More preferred are binary or multi-component graphitization catalysts including Co and V.

The graphitization metal catalyst may include the main catalyst and the auxiliary catalyst in a molar ratio of 10:0.1-10 or 10:0.5-5.

The graphitization catalyst is supported in the form of a precursor, for example, a metal salt, a metal oxide or a metal compound, on the support. Examples of suitable precursors of the graphitization catalyst include Fe salts, Fe oxides, Fe compounds, Ni salts, Ni oxides, Ni compounds, Co salts, Co oxides, Co compounds, Mo oxides, Mo compounds, Mo salts, V oxides, V compounds, and V salts. Other examples of suitable precursors include $Fe(NO_3)_2 \cdot 6H_2O$, $Fe(NO_3)_2 \cdot 9H_2O$, $Fe(NO_3)_3$, $Fe(OAc)_2$, $Ni(NO_3)_2 \cdot 6H_2O$, $Co(NO_3)_2 \cdot 6H_2O$, $Co_2(CO)_8$, $[Co_2(CO)_6(t\text{-}BuC\equiv CH)]$, $Co(OAc)_2$, $(NH_4)_6Mo_7O_{24} \cdot 4H_2O$, $Mo(CO)_6$, $(NH_4)MoS_4$, and $NH_4VO_3$.

The precursor of the graphitization catalyst is supported in the form of a solution on the support, followed by secondary calcination. As a result of the secondary calcination, the precursor is supported in the form of a metal oxide in the supported catalyst.

More specifically, the supported catalyst can be prepared by a method including: mixing a support, for example, a granular aluminum-based support, with an aqueous solution of a graphitization catalyst precursor; and drying the mixture under vacuum, primarily calcining the vacuum-dried at a temperature of about 100° C. to about 450° C. to form a support, supporting a graphitization metal catalyst on the support, and secondarily calcining the catalyst supported on the support at a temperature of 100° C. to 500° C. The supported catalyst for CNT production has a structure in which the surface and pores of the granular support are impregnated and coated with the graphitization catalyst components.

According to one embodiment, the vacuum drying may be performed by rotary evaporation under vacuum at a temperature ranging from about 40 to about 100° C. for a time ranging from about 30 minutes to about 12 hours.

According to one embodiment, the method may further include aging with rotation or stirring at about 45 to about 100° C. before the vacuum drying. The aging may be performed for a maximum of 5 hours, for example, 20 minutes to 5 hours or 1 to 4 hours.

The secondary calcination is performed at a temperature of about 100° C. to about 500° C. to prepare the supported catalyst. The BET specific surface area of CNTs shows a tendency to increase with decreasing catalyst calcination temperature. The second calcination temperature may be in the range of 100 to 500° C., 100 to 400° C., 100 to 300° C., 100 to 200° C., 200 to 300° C., or 200 to 400° C.

The supported catalyst prepared by the method of the present invention may have a particle diameter (or average particle diameter) of about 30 to about 150 μm, as measured before the secondary calcination, and each of the granular support and the graphitization catalyst may have a spherical or potato-like shape with a primary particle diameter of about 10 to about 50 nm. The spherical or potato-like shape refers to a three-dimensional shape having an aspect ratio of 1.2 or less such as a sphere or ellipse.

The CNTs of the present invention may be produced using a fluidized bed reactor. In this case, the particle diameter of the supported catalyst may be adjusted to about 30 to about 150 μm and the number average particle diameter (Mn) of the supported catalyst may be adjusted to 40 to 80 μm or 50 to 70 μm by sorting before use. The reason for this sorting is because it is important that the catalyst fluidized bed is allowed to flow freely in the reaction zone of the fluidized bed reactor while preventing the catalyst from aggregating.

According to one embodiment, the supported catalyst may include about 5 to about 40 parts by weight of the graphitization catalyst, based on 100 parts by weight of the supported catalyst. However, the content of the graphitization catalyst is not limited to this range.

In the case where the supported catalyst includes a Co-based graphitization catalyst, the Co content may be from about 3 to about 100 moles, based on 100 moles of the support.

According to one embodiment, the supported catalyst may have a structure in which the surface and pores of the granular support, preferably the aluminum-based support, are coated with a monolayer or multilayer of the graphitization catalyst.

The supported catalyst of the present invention is preferably prepared by an impregnation method for the following reasons: the supported catalyst has a higher inherent bulk density than coprecipitated catalysts; unlike coprecipitated catalysts, the supported catalyst produces a small amount of a fine powder with a size of 10 microns or less, which reduces the possibility of occurrence of a fine powder due to attrition during fluidization; and high mechanical strength of the supported catalyst effectively stabilizes the operation of a fluidized bed reactor.

The use of the supported catalyst allows for growth of CNTs by chemical vapor synthesis through decomposition of a carbon source, leading to the production of CNTs.

According to the chemical vapor synthesis, the graphitization catalyst is charged into the reactor and a carbon source in the gas phase is then supplied to the reactor at ambient pressure and high temperature to produce carbon nanotubes. A hydrocarbon as the carbon source is thermally decomposed and is infiltrated into and saturated in the graphitization catalyst. Carbon is deposited from the saturated graphitization catalyst and forms hexagonal ring structures.

The chemical vapor synthesis can be performed in such a manner that the supported catalyst is fed into a horizontal fixed bed reactor or fluidized bed reactor and at least one carbon source selected from $C_1$-$C_6$ saturated or unsaturated hydrocarbons, and optionally together with a mixed gas of a reducing gas (e.g., hydrogen) and a carrier gas (e.g., nitrogen) is introduced into the reactor at a temperature of about 500 to about 900° C., about 500 to 800° C., about 600 to about 800° C., about 600 to about 750° C., or about 650 to about 700° C. CNTs may be grown for 30 minutes to 8 hours after the carbon source is introduced into the supported catalyst.

The CNTs of the present invention may be produced using a fluidized bed reactor. In this case, a gas supply port is preferably formed at the bottom of the fluidized bed reactor. A supply gas flows through the gas supply port to prevent the catalyst particles from aggregating or to separate the aggregated catalyst particles into individual particles. The supply gas may be a mixed gas of a carbon source and a reducing gas, a carrier gas or a mixture thereof.

The type of a heat source for the calcination or heat treatment in the method is not limited and may be, for example, induction heating, radiant heating, laser, IR, microwave, plasma, UV or surface plasmon heating.

Any carbon source used for the chemical vapor synthesis may be used without particular limitation so long as it can supply carbon and can exist in the gas phase at a temperature of 300° C. or more. The gas-phase carbonaceous material may be any carbon-containing compound. The gas-phase carbonaceous material is preferably a compound consisting of up to 6 carbon atoms, more preferably a compound consisting of up to 4 carbon atoms. Examples of such gas-phase carbonaceous materials include, but are not limited to, carbon monoxide, methane, ethane, ethylene, ethanol, acetylene, propane, propylene, butane, butadiene, pentane, pentene, cyclopentadiene, hexane, cyclohexane, benzene, and toluene. These gas-phase carbonaceous materials may be used alone or as a mixture thereof. The mixed gas of hydrogen and nitrogen transports the carbon source, prevents CNTs from burning at high temperature, and assists in the decomposition of the carbon source.

The gas-phase carbon source, hydrogen, and nitrogen may be used in various volume ratios, for example, 1:0.1-10:0-10 or 1:0.5-1.5:0.5-1.5. The reaction gases may be supplied at a flow rate of about 100 to about 5000 sccm.

After growth of CNTs by heat treatment at high temperature, the CNTs are cooled. Due to this cooling, the CNTs are more regularly aligned. The CNTs may be naturally cooled (i.e. by removal of the heat source) or may be cooled at a rate of about 5 to about 30° C./min.

The CNTs thus produced are of a bundle type and have a BET specific surface area of at least about 200 m$^2$/g, preferably about 200 m$^2$/g to about 500 m$^2$/g. The specific surface area can be measured by the BET method.

The method enables the production of CNTs in high yield, for example, about 5 times to about 50 times or about 10 times to 40 times. The yield of the carbon nanotubes can be determined by measuring the content of the carbon nanotubes obtained at room temperature using an electronic scale. The reaction yield can be calculated by substituting the weight of the supported catalyst used and the total weight after the reaction into the following expression:

CNT yield (times)=(the total weight after the reaction (g)−the weight of the supported catalyst used (g))/the weight of the supported catalyst used (g)

The CNTs of the present invention may be of a bundle type and may have an aspect ratio of about 0.9 to about 1. In addition, the CNTs of the present invention may have a strand diameter of about 2 nm to about 20 nm, preferably about 3 nm to about 8 nm. The strand diameter of the CNTs decreases with increasing BET specific surface area.

The aspect ratio can be defined by the following expression:

Aspect ratio=the shortest diameter passing through the center of CNT/the longest diameter passing through the center of CNT As described above, the CNTs have a large BET specific surface area, i.e. a small diameter, and are of a bundle type. Based on such characteristics, the CNTs are readily dispersible in and miscible with other materials, for example, polymers, and can thus be used to manufacture composite materials with improved physical properties.

Therefore, the CNTs of the present invention are suitable for use in the manufacture of various display devices, such as LCDs, OLEDs, PDPs, and e-papers, electrode structures, such as solar cells, fuel cells, lithium batteries, and supercapacitors, functional composite materials, energy materials, pharmaceuticals, and semiconductors, such as FETs.

The following examples are provided to assist in understanding the invention. However, it will be obvious to those skilled in the art that these examples are merely illustrative and various modifications and changes are possible without departing from the scope and spirit of the invention. Accordingly, it should be understood that such modifications and changes are encompassed within the scope of the appended claims.

Example 1

A. Preparation of Aqueous Solution of Graphitization Metal Catalyst Precursor A Co—V metal catalyst as a graphitization catalyst was prepared by the following procedure.

Citric acid was added to a solution of $NH_4VO_3$ as a V precursor in 20 ml water in flask A, and then $Co(NO_3)_2 \cdot H_2O$ as a Co precursor was added thereto to prepare an aqueous metal solution. The V precursor and the Co precursor were added in such amounts that the molar ratio of Co:V was 10:1. The aqueous metal solution was observed to be clear and free of precipitates.

B. Preparation of Support

Aluminum trihydroxide ($Al(OH)_3$) as an aluminum-based support was calcined at 400° C. for 4 h to obtain ATH400. 20 g of ATH400 was placed in flask B. XRD analysis revealed the presence of 40 wt % of AlO(OH) in the calcined support.

C. Preparation of Supported Catalyst 40 g of the solution in flask A was added to flask B such that the numbers of moles of Co and V were 30 moles and 3 moles, respectively, when the number of moles of ATH400 (20 g) was assumed to be 100 moles. The graphitization catalyst metal precursor was sufficiently supported on ATH400 and aged with stirring in a thermostatic bath at 60° C. for 5 min. The aged graphitization catalyst supported on the support was rotated at 80 rpm and dried under vacuum for 60 min while maintaining the temperature. The dried catalyst was calcined at 120° C. for 4 h to produce a homogeneous supported catalyst.

D. CNT Synthesis

A test for the synthesis of CNTs using the supported catalyst prepared in C was conducted in a fixed bed reactor on a laboratory scale. Specifically, the supported catalyst was mounted at the center of a quartz tube having an inner diameter of 55 mm and heated to 670° C. under a nitrogen atmosphere. A mixed gas of nitrogen, hydrogen and ethylene gas in the same volumes was allowed to flow at a rate of 180 ml/min for a total of 1 h while maintaining the same temperature, affording a carbon nanotube aggregate.

The CNTs were found to have the following physical properties:

Yield=9.59 times
BET specific surface area=381 m$^2$/g
$I_G/I_D$=0.8188±0.0284

The BET specific surface area was calculated by measuring the amount of nitrogen gas adsorbed at a liquid nitrogen temperature of 77 K using BELSORP-mini II (BEL Japan).

The ratio $I_G/I_D$ was measured at a laser wavelength of 532 nm using a DXR Raman microscope (Thermo Electron Scientific Instruments LLC).

Example 2

Bundle type CNTs were produced in the same manner as in Example 1, except that ATH300 was obtained by calcining aluminum trihydroxide at 300° C. instead of 400° C.

The CNTs were found to have the following physical properties:
Yield=9.68 times
BET specific surface area=412 m$^2$/g
$I_G/I_D$=0.7738±0.0407

Example 3

Bundle type CNTs were produced in the same manner as in Example 2, except that the temperature of the reactor was changed from 670° C. to 690° C.
The CNTs were found to have the following physical properties:
Yield=9.25 times
BET specific surface area=394 m$^2$/g
$I_G/I_D$=0.8690±0.0604

Example 4

Bundle type CNTs were produced in the same manner as in Example 1, except that the temperature of the reactor was changed from 670° C. to 710° C.
The CNTs were found to have the following physical properties:
Yield=15.33 times
BET specific surface area=311 m$^2$/g
$I_G/I_D$=0.9202±0.0590

Example 5

Bundle type CNTs were produced in the same manner as in Example 1, except that the temperature of the reactor was changed from 670° C. to 690° C.
The CNTs were found to have the following physical properties:
Yield=14.77 times
BET specific surface area=355 m$^2$/g
$I_G/I_D$=0.8496±0.0593

Example 6

Bundle type CNTs were produced in the same manner as in Example 5, except that the molar ratio of Co:V was changed from 10:1 to 20:1.
The CNTs were found to have the following physical properties:
Yield=8.50 times
BET specific surface area=311 m$^2$/g
$I_G/I_D$=0.8103±0.0395

Example 7

Bundle type CNTs were produced in the same manner as in Example 5, except that the molar ratio of Co:V was changed from 10:1 to 5:1.
The CNTs were found to have the following physical properties:
Yield=14.99 times
BET specific surface area=300 m$^2$/g
$I_G/I_D$=0.8332±0.0313

Example 8

Bundle type CNTs were produced in the same manner as in Example 7, except that Fe and Mo were used in a molar ratio of 5:1 instead of Co and V in a molar ratio of 5:1.
The CNTs were found to have the following physical properties:
Yield=1.08 times
BET specific surface area=218 m$^2$/g
$I_G/I_D$=1.1443±0.0909

Example 9

Bundle type CNTs were produced in the same manner as in Example 7, except that Co and Mo were used in a molar ratio of 5:1 instead of instead of Co and V in a molar ratio of 5:1.
The CNTs were found to have the following physical properties:
Yield=5.48 times
BET specific surface area=277 m$^2$/g
$I_G/I_D$=0.8412±0.0436

Example 10

Bundle type CNTs were produced in the same manner as in Example 9, except that the calcination temperature for the preparation of the supported catalyst was changed from 120° C. to 300° C.
The CNTs were found to have the following physical properties:
Yield=25.88 times
BET specific surface area=232 m$^2$/g
$I_G/I_D$=1.0504±0.0383

Example 11

Bundle type CNTs were produced in the same manner as in Example 9, except that the calcination temperature for the preparation of the supported catalyst was changed from 120° C. to 500° C.
The CNTs were found to have the following physical properties:
Yield=21.71 times
BET specific surface area=225 m$^2$/g
$I_G/I_D$=1.1044±0.0227

Example 12

Bundle type CNTs were produced in the same manner as in Example 9, except that nitrogen, ethylene, and hydrogen were allowed to flow at rates of 0 ml/min, 60 ml/min, and 120 ml/min, respectively.
The CNTs were found to have the following physical properties:
Yield=9.12 times
BET specific surface area=269 m$^2$/g
$I_G/I_D$=0.8726±0.0248

Comparative Example 1

CNTs were produced in the same manner as in Example 3, except that commercially available boehmite as a support was used without calcination.
The CNTs were found to have the following physical properties:
Yield=8.36 times
BET specific surface area=292 m$^2$/g
$I_G/I_D$=0.9948±0.0302

Comparative Example 2

CNTs were produced in the same manner as in Example 3, except that commercially available γ-alumina as a support was used without calcination.

The CNTs were found to have the following physical properties:
Yield=8.25 times
BET specific surface area=318 m²/g
$I_G/I_D$=0.9052±0.0136

Comparative Example 3

CNTs were produced in the same manner as in Example 9, except that the calcination temperature for the preparation of the supported catalyst was changed from 120° C. to 700° C.

The CNTs were found to have the following physical properties:
Yield=26.26 times
BET specific surface area=188 m²/g
$I_G/I_D$=1.2187±0.0177

Comparative Examples 4 to 6

The following commercially available CNTs were used.
Comparative Example 4: Sample 1 (Chengdu Organic Chemicals): BET=235, $I_G/I_D$ ratio=6.91
Comparative Example 5: Sample 2 (MI): BET=30-45, $I_G/I_D$ ratio=0.96
Comparative Example 6: Sample 3 (US Research Nanomaterials): BET=346, $I_G/I_D$ ratio=1.7155
The reaction conditions for CNT production in Examples 1-12 and Comparative Examples 1 and 2 are summarized in Table 1.

TABLE 1

| Example No. | Support | Temp. for calcination of support (° C.) | Catalytic metals | Temp. for calcination of catalyst (° C.) | Reactor temp. (° C.) | Volume ratio of mixed gases ($N_2$:$C_2H_4$:$H_2$) (sccm) |
|---|---|---|---|---|---|---|
| Example 1 | ATH400 | 400 | Co:V = 10:1 | 120 | 670 | 60:60:60 |
| Example 2 | ATH300 | 300 | Co:V = 10:1 | 120 | 670 | 60:60:60 |
| Example 3 | ATH300 | 300 | Co:V = 10:1 | 120 | 690 | 60:60:60 |
| Example 4 | ATH400 | 400 | Co:V = 10:1 | 120 | 710 | 60:60:60 |
| Example 5 | ATH400 | 400 | Co:V = 10:1 | 120 | 690 | 60:60:60 |
| Example 6 | ATH400 | 400 | Co:V = 20:1 | 120 | 690 | 60:60:60 |
| Example 7 | ATH400 | 400 | Co:V = 5:1 | 120 | 690 | 60:60:60 |
| Example 8 | ATH400 | 400 | Fe:Mo = 5:1 | 120 | 690 | 60:60:60 |
| Example 9 | ATH400 | 400 | Co:Mo = 5:1 | 120 | 690 | 60:60:60 |
| Example 10 | ATH400 | 400 | Co:Mo = 5:1 | 300 | 690 | 60:60:60 |
| Example 11 | ATH400 | 400 | Co:Mo = 5:1 | 500 | 690 | 60:60:60 |
| Example 12 | ATH400 | 400 | Co:V = 5:1 | 120 | 690 | 0:60:120 |
| Comparative Example 1 | Commercial boehmite | — | Co:V = 10:1 | 120 | 690 | 60:60:60 |
| Comparative Example 2 | commercial γ-alumina | | Co:V = 10:1 | 120 | 690 | 60:60:60 |
| Comparative Example 3 | ATH400 | 400° C. | Co:Mo = 5:1 | 700 | 690 | 60:60:60 |

The physical properties of the CNT products obtained in Examples 1-12 and Comparative Examples 1-6 are summarized in Table 2.

TABLE 2

| Example No. | Yield (times) | CNT shape | y BET surface area (m²/g) | x $I_G/I_D$ ratio | −427.2 * x |
|---|---|---|---|---|---|
| Example 1 | 9.59 | Bundle type | 381 | 0.8188 | −349.79 |
| Example 2 | 9.68 | Bundle type | 412 | 0.7738 | −330.57 |
| Example 3 | 9.25 | Bundle type | 394 | 0.8690 | −371.24 |
| Example 4 | 15.33 | Bundle type | 311 | 0.9202 | −393.11 |
| Example 5 | 14.77 | Bundle type | 355 | 0.8496 | −362.95 |
| Example 6 | 8.50 | Bundle type | 311 | 0.8103 | −346.16 |
| Example 7 | 14.99 | Bundle type | 300 | 0.8332 | −355.94 |
| Example 8 | 1.08 | Bundle type | 218 | 1.1443 | −488.85 |
| Example 9 | 5.48 | Bundle type | 277 | 0.8412 | −359.36 |
| Example 10 | 25.88 | Bundle type | 232 | 1.0504 | −448.73 |
| Example 11 | 21.71 | Bundle type | 225 | 1.1044 | −471.80 |
| Example 12 | 9.12 | Bundle type | 269 | 0.8726 | −372.77 |
| Comparative Example 1 | 8.36 | Non-bundle type | 292 | 0.9948 | −424.98 |
| Comparative Example 2 | 8.25 | Non-bundle type | 318 | 0.9052 | −386.70 |
| Comparative Example 3 | 26.26 | Bundle type | 188 | 1.2187 | −520.63 |
| Comparative Example 4 | — | Non-bundle type | 235 | 6.91 | −2951.95 |
| Comparative Example 5 | — | Non-bundle type | 30-45 | 0.96 | −410.11 |
| Comparative Example 6 | — | Non-bundle type | 346 | 1.7155 | −732.86 |

FIG. 1 is a graph showing the relationship between the BET specific surface areas (y) and the $I_G/I_D$ ratios (x) of the CNT products produced in Examples 1-12. As can be seen from FIG. 1, x and y of the CNT products produced in Examples 1-12 satisfy the following relationship:

$$-427.2x+600 \le y \le -427.2x+800$$

More specifically, x and y of the CNT products produced in Examples 1, 2, 4, 5, and 8 satisfy the following relationship:

$$-427.2x+700 \le y \le -427.2x+750$$

x and y of the CNTs produced in Example 3 satisfy the following relationship:

$$-427.2x+750 \le y \le -427.2x+800$$

x and y of the CNT products produced in Examples 6, 7, 10, and 11 satisfy the following relationship:

$$-427.2x+650 \le y \le -427.2x+700$$

x and y of the CNT products produced in Examples 9 and 12 satisfy the following relationship:

−427.2x+600≤y≤−427.2x+650

In contrast, none of the CNT products produced in Comparative Examples 1-6 are of a bundle type, have a specific surface area of 200 m²/g or more, and satisfy the above relationships.

Comparative Evaluation 1—Temperatures for Primary Calcination of the Supports

The aluminum trihydroxide supports used for the production of the CNT products in Examples 3 and 5 were calcined at 300° C. and 400° C., respectively. As can be seen from the results in Table 2, the other processing conditions were the same but the CNT products had different yields and BET specific surface areas despite the same. Taking into consideration these results, the temperature for calcination of the support affects the yield and physical properties of the corresponding CNT product.

Comparative Evaluation 2—Shapes of the CNT Products

FIGS. 2, 3, 4, and 5 show SEM images of the CNT products produced in Examples 3 and 12 and Comparative Examples 1 and 2, respectively.

The SEM images show that the CNT products using aluminum trihydroxide as the support precursor in Examples 3 and 12 were of bundle types, whereas the CNT products using commercial boehmite and γ-alumina as the supports in Comparative Examples 1 and 2, respectively, had non-bundle type entangled structures.

Comparative Evaluation 3—Temperatures for Secondary Calcination of the Catalysts The catalysts were calcined at 120° C., 300° C., 500° C., and 700° C. in Examples 10, 11, and 12, and Comparative Example 3, respectively. As can be seen from the results in Table 2, the BET specific surface area decreased with increasing temperature for calcination of the corresponding catalyst.

Comparative Evaluation 4—Catalyst Types

Co/V, Fe/Mo, and Co/Mo as binary catalysts were used in Examples 7, 9, and 10, respectively. The CNT products using the corresponding Co-based catalysts in Examples 7 and 10 had large BET specific surface areas and high yields. Particularly, the best results were obtained in the CNTs using the CoV catalyst (Example 7).

Comparative Evaluation 5—Ratios of the Main Catalyst to the Auxiliary Catalyst

Co and V were used in different molar ratios of 10:1, 20:1, and 5:1 in Examples 5, 6, and 7, respectively. All of the CNT products showed large BET specific surface areas and high yields. The CNTs using Co and V in a molar ratio of 10:1 (Example 5) had the largest BET specific surface area.

Comparative Evaluation 6—Catalyst Content

CNTs were produced under the same reaction conditions as in Example 5, except that the Co content (wt %) was changed as shown in Table 3. The yields, BET specific surface areas, and $I_G/I_D$ ratios of the CNT products are shown in Table 3. The Co content (wt %) was calculated by: (the weight of Co impregnated/the final catalyst weight)× 100. Example 5 is replaced by Example 5-1 in Table 3 for convenience.

TABLE 3

| Example No. | Co (wt %) | Yield (times) | BET surface area (m²/g) | $I_G/I_D$ ratio |
|---|---|---|---|---|
| Example 5-1 | 12.5 | 14.77 | 355 | 0.8496 |
| Example 5-2 | 14.1 | 20.02 | 306 | 0.8530 |
| Example 5-3 | 10.9 | 8.30 | 338 | 0.8535 |
| Example 5-4 | 9.2 | 1.43 | 299 | 0.8675 |

Comparative Evaluation 7—Reaction Gas Compositions

The reaction gases were used in different mixing ratios and the other conditions were the same in Examples 7 and 12. The CNTs produced using the reaction gases in the same amounts (Example 7) had a larger specific surface area and a higher yield.

Comparative Evaluation 8—Reaction Temperatures

The reaction temperatures were 670° C., 710° C., and 690° C. in Examples 1, 4, and 5, respectively. The CNTs produced at a reaction temperature of 670° C. (Example 1) had the largest BET specific surface area.

What is claimed is:

1. A composition comprising bundle type carbon nanotubes attached to a metal catalyst, the catalyst comprising Co, and one or more of V, Mo, and Fe, the bundle type carbon nanotubes having a BET specific surface area of 200 m²/g to 400 m²/g wherein the BET specific surface area and the ratio of the integrated area under the G-band peak ($I_G$) to the integrated area under the D-band peak ($I_D$) ($I_G/I_D$) of the bundle-type carbon nanotubes measured by Raman spectroscopy at a laser wavelength of 532 nm satisfy the following relationship:

$$y=ax+b$$

where y is the BET specific surface area, x is the ratio $I_G/I_D$, a is a constant from −400 to −500, and b is a constant from 600 to 800, and wherein the ratio $I_G/I_D$ is 0.7-0.9.

2. The composition according to claim 1, wherein the bundle type carbon nanotubes have a BET specific surface area (y) and the ratio $I_G/I_D$ (x) satisfy the following relationship:

$$200 \leq y \leq -427.2x+800$$

where y is the BET specific surface area (m²/g) and x is the ratio $I_G/I_D$.

3. A composite material comprising the composition according to claim 1.

4. The composition according to claim 1, wherein the carbon nanotubes have an aspect ratio of 0.9 to 1.0.

5. The composition of claim 1, wherein the catalyst comprises Co and V.

* * * * *